United States Patent [19]
Johansson

[11] Patent Number: 5,815,545
[45] Date of Patent: Sep. 29, 1998

[54] NUCLEAR FUEL ASSEMBLY SPACER AND SPRING

[75] Inventor: Eric B. Johansson, Prescott, Ariz.

[73] Assignee: General Electric Company, Schenectady, N.Y.

[21] Appl. No.: 802,559

[22] Filed: Feb. 19, 1997

[51] Int. Cl.⁶ ................................................ G21C 3/34
[52] U.S. Cl. ........................ 376/442; 376/441; 376/446
[58] Field of Search .................................. 376/441, 442, 376/446, 448

[56] References Cited

U.S. PATENT DOCUMENTS

| | | |
|---|---|---|
| 4,508,679 | 4/1985 | Matzner et al. . |
| 4,571,324 | 2/1986 | Johansson et al. . |
| 4,587,704 | 5/1986 | Matzner et al. . |
| 5,002,726 | 3/1991 | Johansson . |
| 5,069,864 | 12/1991 | Johansson . |
| 5,089,221 | 2/1992 | Johansson et al. . |
| 5,186,891 | 2/1993 | Johansson et al. . |
| 5,526,387 | 6/1996 | Johansson et al. . |
| 5,566,217 | 10/1996 | Croteau et al. . |

Primary Examiner—Charles T. Jordan
Assistant Examiner—Matthew J. Lattig
Attorney, Agent, or Firm—Nixon & Vanderhye

[57] ABSTRACT

The ferrule spacer includes a ferrule having an elongated slot with a pair of tabs projecting laterally into the slot. An elongated spring has opposite ends bearing against the interior wall of the ferrule and flats overlying the tabs along the outside of the ferrule. The mid-span portion of the spring projects in a central aperture between the ferrule tabs for biased bearing engagement against the fuel rod. The fuel rod is maintained against oppositely disposed stops formed on the ferrule. The spring is inserted and removed from the inside of the ferrule.

19 Claims, 14 Drawing Sheets

FIG. 11
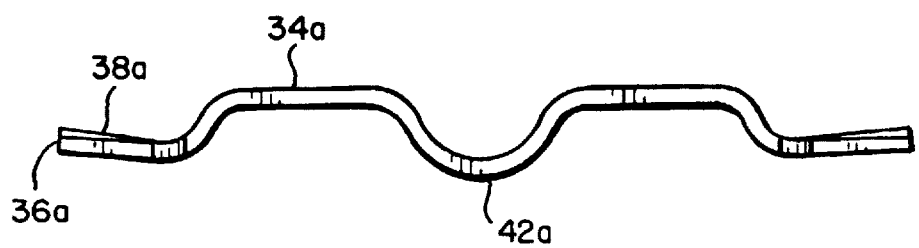
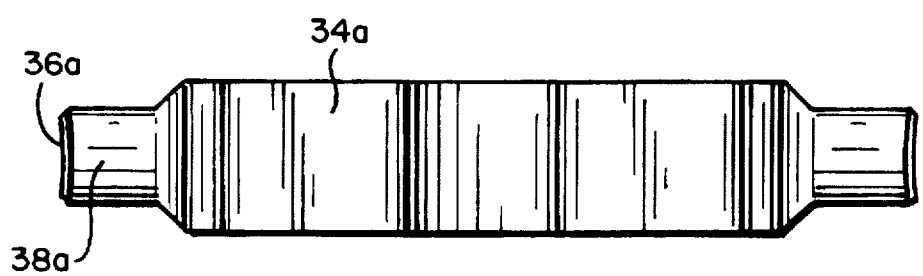
FIG. 12
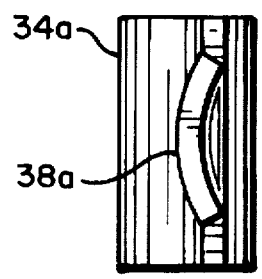
FIG. 13

NUCLEAR FUEL ASSEMBLY SPACER AND SPRING

The present invention relates to spacers for the fuel rods of a nuclear fuel rod bundle and particularly relates to ferrules and springs and assemblies thereof configured and oriented laterally for locating and restraining the fuel rods of a fuel bundle when the bundle is disposed in the nuclear reactor in the vertical orientation and for supporting the fuel rods of the bundle in a generally horizontal configuration, for example, during manufacture and/or shipment.

Generally, in a nuclear fuel bundle, there are provided a plurality of elongated nuclear fuel rods supported between upper and lower tie plates and within channels whereby, in the nuclear reactor, coolant/moderator flows upwardly between the fuel rods for conversion to steam. Typically, the fuel rods are located relative to one another by a plurality of spacers spaced one from the other along the length of the fuel bundle. The length of the fuel rods can be on the order of approximately 160 inches. It will be appreciated that the fuel rods have an outer diameter of about 0.5 inches and typically are arranged in an array thereof within a bundle, for example, a 10×10 array. Additionally, water rods are also provided within the bundle and, in a 10×10 array, for example, two such water rods may occupy eight of the lattice or cell positions which could otherwise have been occupied by fuel rods. Consequently, a 10×10 fuel bundle array may comprise 92 fuel rods and a pair of water rods.

Spacers are typically formed in rectilinear grids defining cells, each cell confining and restraining a discrete fuel rod. There are many different types of spacer assemblies, for example, eggcrate spacers, as well as spacers formed of individual ferrules such as described and illustrated in U.S. Pat. Nos. 5,186,891 and 5,089,221, of common assignee herewith. Most such spacers use one or more springs to bias the fuel rod confined in each cell against a pair of stops along opposite sides of the cell, thus maintaining the fuel rod in a predetermined position within the bundle relative to other fuel rods of the bundle. For example, in the spacers illustrated in those patents, each cell is comprised of upper and lower arms interconnected one with the other by a pair of springs. The cells generally have an octagonal configuration, with the springs disposed between the upper and lower arms lying along right angularly related sides of the cell, while stops are provided along the opposing right angularly related sides of the upper and lower arms in opposition to the respective springs. Each cell is welded to an adjacent cell and an encircling band of the spacer maintains the array of cells in the rectilinear grid.

Ferrule-type cells are also used in spacer assemblies. Each ferrule comprises a generally cylindrical sleeve which, in cooperation with an adjacent ferrule, maintains a spring between the ferrules and fuel rods for biasing the fuel rod in one ferrule against stops in the ferrule. Such arrangement is described and illustrated in U.S. Pat. No. 5,069,864, of common assignee herewith. See also U.S. Pat. No. 5,002,726, of common assignee.

Nuclear fuel bundles, however, are typically manufactured off-site and transported from a nuclear manufacturing and assembly facility to a nuclear reactor site. In the course of manufacture and transportation, the fuel bundles are typically oriented in a generally horizontal configuration, with the fuel rods lying generally horizontal and the spacers supported along one of their sides. In prior spacers, including those of the aforementioned patents, the orientation of the springs and stops in the cells is such that a substantial majority of the fuel rods will rest, in the manufacture, assembly and transport positions of the bundle, on one or both of the springs. If the rods sit on the springs, the springs will take a permanent deformation or set due to their weight and particularly when acceleration forces are encountered during transport. The springs have substantially greater flexibility than the stops. However, during shipping, the fuel bundle is in a horizontal orientation and a local greater-than-the-design load is frequently exerted on the spring and the spring deforms. In co-pending application Ser. No. 08/621,879, filed Mar. 26, 1996, of common assignee herewith, a spacer assembly is described and illustrated wherein the stops are oriented in a single direction such that the fuel bundle can be disposed on its side for assembly and transportation to a nuclear reactor site. With respect to ferrule-type spacers, for example, as illustrated in U.S. Pat. No. 5,002,726, spacer springs typically act on two adjacent fuel rods. This requires that the spacer cells be arranged in pairs with the cell stops oriented opposite one another. U.S. Pat. No. 5,069,864 discloses a spacer spring which acts on a single fuel rod. With each spring in a spacer acting on a single fuel rod, the stops in all the cells can be oriented in the same direction, hence, supporting the fuel rods when the fuel bundle is horizontal. However, recent spacer designs have required reduced cell height. A spring, as disclosed in U.S. Pat. No. 5,069,864, used in a reduced-height cell, would be very short and would be too stiff.

SUMMARY OF THE PRESENT INVENTION

In accordance with the present invention, there is provided a ferrule-type spacer for the spacer assembly of a nuclear fuel bundle wherein each ferrule has reduced cell height and a spring which acts on a single fuel rod, enabling the fuel bundle to be disposed on a side, i.e., horizontally, during assembly and transport to a nuclear reactor site. Also, the present spring design enables orientation of all springs in the same direction for shipping, reduces costs and facilitates manufacture. To accomplish the foregoing, the spacer spring is stamped from sheet metal and acts as a simple beam, supported at each end and having a load bearing projection located at mid-span. Basically, each ferrule is provided with an elongated slot having a pair of axially spaced tabs projecting laterally from one edge into the slot. A second slot is provided in each ferrule diametrically opposite the first slot.

The spring has opposite ends configured to generally conform to the interior wall surfaces of a ferrule. The spring is also bent laterally outwardly to pass through apertures between the tabs and the end portions of the ferrule to define a pair of flats which externally overlie the tabs of the ferrule. The spring is formed or bent to have a mid-span load bearing projection which projects inwardly through the aperture between the tabs for engagement against the fuel rod when the fuel rod is inserted into the ferrule. When the ferrule is placed next to an adjacent ferrule, the spring projects into the second slot or cut-out of the adjacent ferrule and, consequently, cannot be moved laterally. The tabs prevent motion of the spring into the cell and restrict motion in the direction of the axis of the cell.

The spring is inserted and removed from the inside of the ferrule. For example, with the spring within the ferrule at an elevation corresponding to its final position, the ends of the springs at their lateral edges engage the interior wall of the ferrule beyond the elongated slot. Also, the flats lie within the slot with opposite edges inside and outside of the ferrule, ready for rotation toward final position. The mid-span projection lies within the ferrule. By rotating the spring laterally, the flats are located externally of the tabs and the mid-span projection remains within the ferrule. A force is applied to the mid-span projection, projecting it outwardly so that the flats clear the tabs, while the spring is being inserted. After insertion, the force is removed and spring deflection is restrained by the tabs, applying a preload to the spring. The spring is held in the ferrule by this preload during assembly of the spacer. When the fuel rod is inserted, it deflects the spring away from the tabs and takes the full spring force. This preload does not affect the load on the fuel rod. This spring, however, is less subject to overload during shipping. The max spring deflection during shipping is the same as with prior springs, but the present spring is more flexible, so that the load increase at max deflection is less. In final disposition of the spring, the flats are spaced from the tabs and the opposite ends of the spring engage in conformal relation against the interior wall of the cell, with the mid-span projection biasing the fuel rod against generally opposed stops of the ferrule.

It will be appreciated that in the foregoing-described configuration, an adjacent cell is employed to constrain the spring. Adaptation of that design involves complexity when the ferrule spacers are applied to spacer designs having missing cells, for example, to provide for large water rods or to define steam vent volumes above part-length fuel rods. Accordingly, and in a variation of the present invention, the spring and ferrule design described below do not require an adjacent cell to constrain the spring, each spring and its cell being independent.

In this first variation, a third tab projects from an opposite edge of the elongated slot at an elevation along the ferrule between the oppositely disposed pair of tabs. When the spring is applied to the ferrule, this central tab prevents lateral displacement of the spring. Further, the pair of tabs are flattened and bent slightly inwardly of the circumferential extent of the ferrule.

In a second variation, the additional tab is omitted and the pair of tabs project slightly inwardly of the circumferential confines of the ferrule. While this removes a restraint to lateral motion of the spring, the spring cannot escape from the cell with the fuel rods inserted.

In a preferred embodiment according to the present invention, there is provided a ferrule and spring combination for positioning at least one of a plurality of nuclear fuel rods in a spacer of a nuclear fuel bundle, comprising a generally cylindrical ferrule having an axis, a slot elongated in the direction of the axis and closed at opposite ends thereof, and a pair of tabs spaced axially from one another extending into the slot from an edge thereof and terminating short of an opposite edge of the slot to define axially spaced apertures along the slot, an elongated spring having opposite ends engaging the long interior wall portions of the closed end portions of the ferrule between the respective opposite ends of the slot and ends of the ferrule, the spring having flats located along the spring inwardly of the ends thereof for overlying the tabs outwardly of the ferrule and a projection located between the flats and projecting inwardly from the flats and through an aperture of the slot between the tabs for engaging a fuel rod disposed within the ferrule.

In a further preferred embodiment according to the present invention, there is provided a spacer for positioning a plurality of nuclear fuel rods in a nuclear fuel bundle, comprising a marginal band defining an enclosed space, a plurality of generally cylindrical ferrules in the space within the marginal band, each ferrule having an axis, a slot elongated in the direction of the axis and enclosed at opposite ends thereof, and a pair of tabs spaced axially from one another extending into the slot from an edge thereof and terminating short of an opposite edge of the slot to define axially spaced apertures along the slot, each ferrule having an associated elongated spring having opposite ends engaging interior wall portions of closed end portions of the associated ferrule between the respective opposite ends of the slot and ends of the associated ferrule, each spring having flats located along the spring inwardly of the ends thereof for overlying the tabs outwardly of the associated ferrule and a projection located between the flats and projecting inwardly from the flats and through an aperture of the slot between the tabs for engaging a fuel rod disposed within the associated ferrule.

Accordingly, it is a primary object of the present invention to provide a novel and improved spacer assembly having ferrules and springs for locating and positioning fuel rods in a nuclear fuel bundle when in a vertical position and enabling the assembly and transportation of the fuel bundle with the fuel rods bearing against stops of the ferrules rather than springs.

BRIEF DESCRIPTION OF THE DRAWINGS

FIGS. 11, 12 and 13 are views similar to FIGS. 5, 6 and 7, respectively, and illustrating a further form of spring useful in a second embodiment hereof;

BEST MODE FOR CARRYING OUT THE INVENTION

Figure 1:
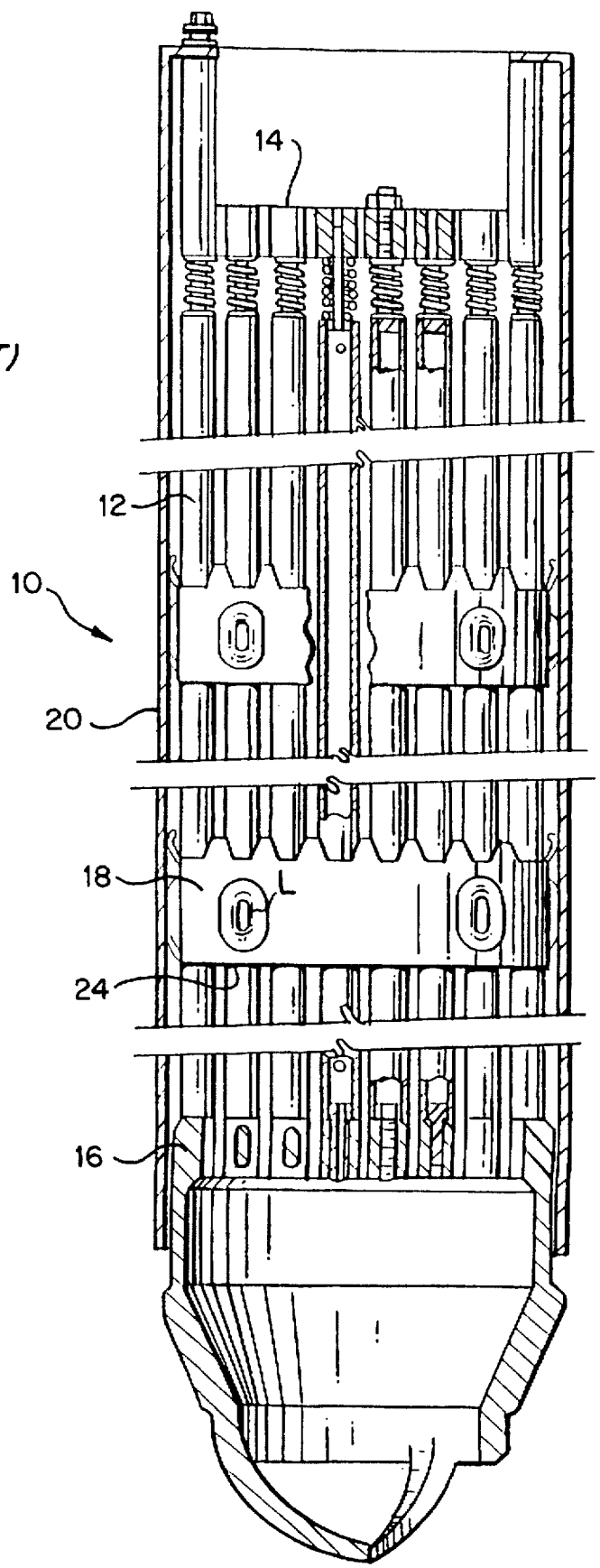
FIG. 1 is a vertical cross-sectional view through a conventional nuclear fuel bundle.

Referring now to the drawing figures, particularly to FIG. 1, there is illustrated a nuclear fuel assembly, generally designated 10, including a plurality of fuel elements or rods 12 supported between an upper tie plate 14 and a lower tie plate 16. Fuel rods 12 pass through a plurality of fuel rod spacers 18 at vertically spaced positions along the fuel bundle. Spacers 18 provide intermediate support to retain the elongated rods 12 in spaced relation relative to one another and to restrain the fuel rods from lateral vibration. With respect to FIG. 1, an 8×8 array of fuel rods is illustrated. It will be appreciated, however, that the invention hereof is applicable to different arrays of fuel rods, for example, 10×10 or 11×11 arrays.

Each fuel rod is formed of an elongated tube with nuclear fuel pellets and other materials sealed in the tube by end plugs. The lower end plugs register in bores formed in the lower tie plate 16, while the upper end plugs are disposed in cavities in the upper tie plate 14. Additionally, the fuel assembly includes a channel 20 substantially square in cross-section and sized to form a sliding fit over the upper and lower tie plates and the spacers.

Figure 2:
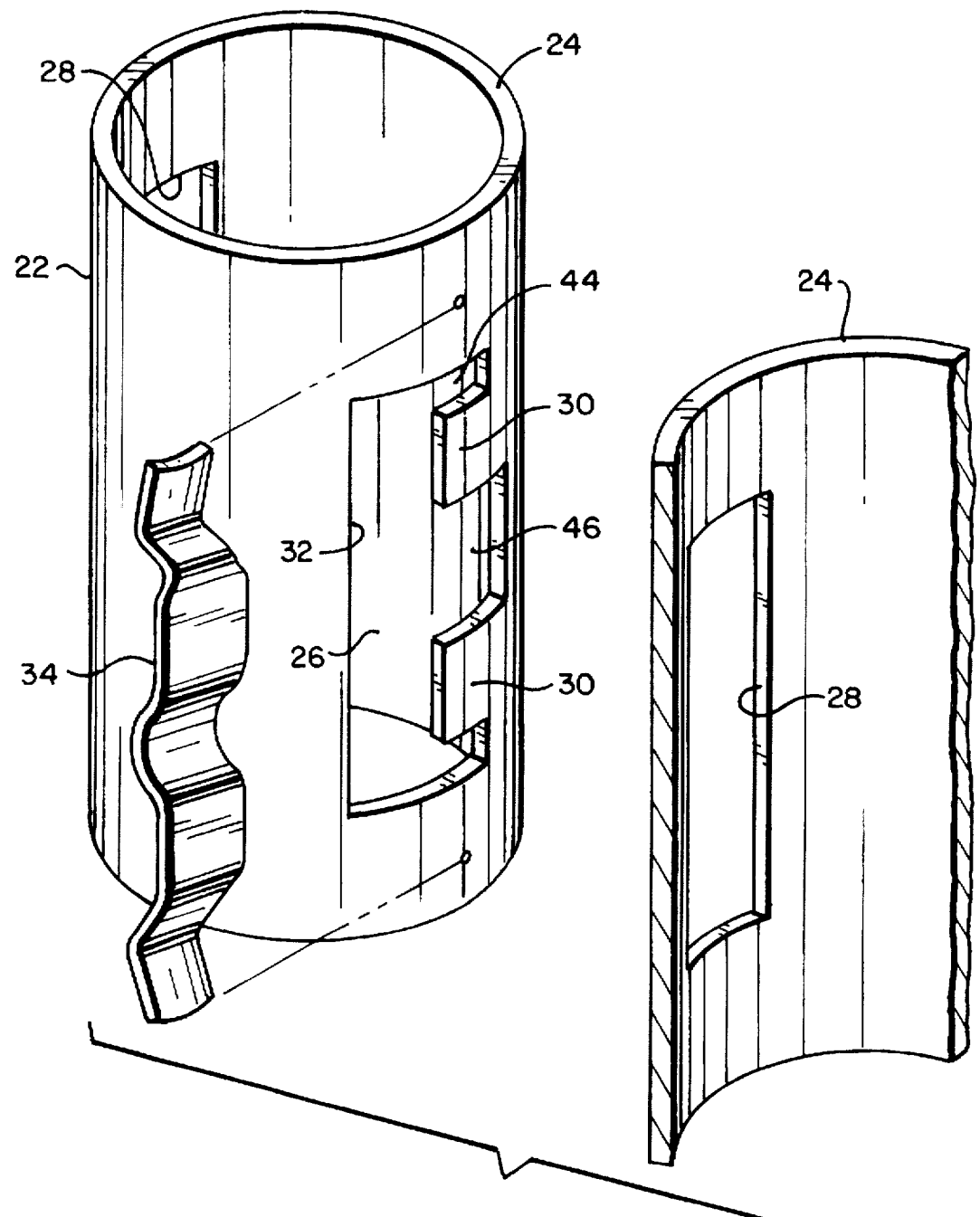
FIG. 2 is an exploded perspective view with parts broken out of a pair of adjacent ferrules and a spring disposed between the ferrules, all in accordance with the present invention.
Figure 3:
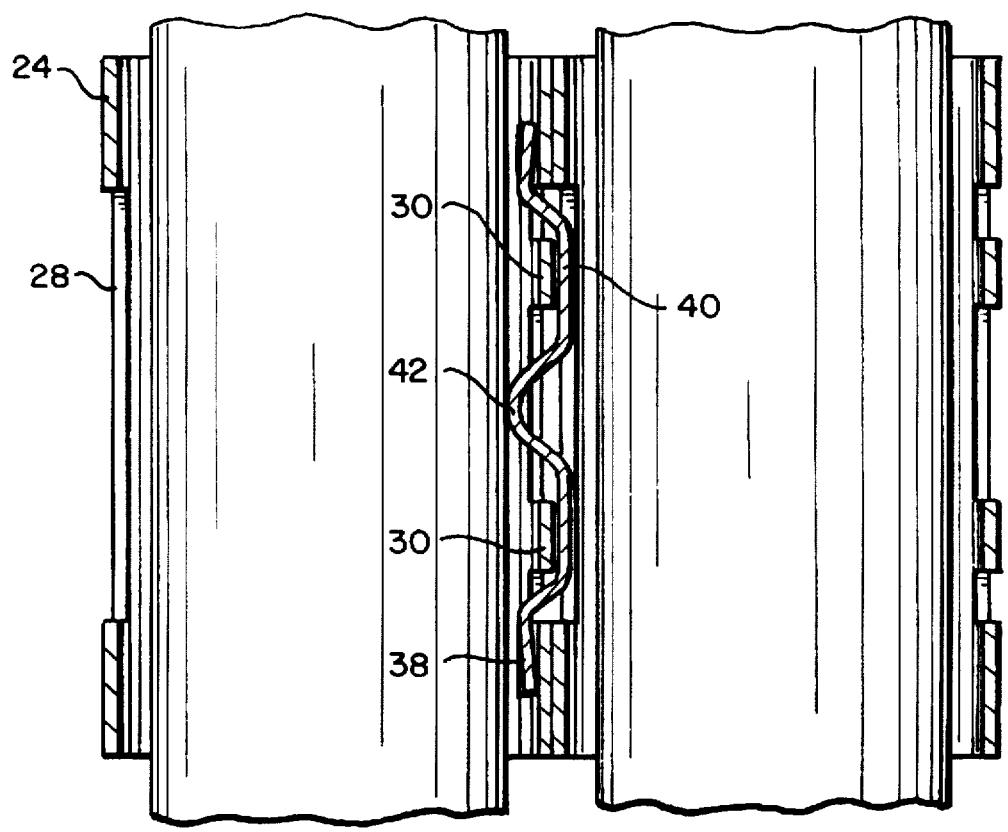
FIG. 3 is a fragmentary vertical cross-sectional view illustrating a pair of adjacent ferrules with a spring therebetween and engaging one of the fuel rods.
Figure 4:
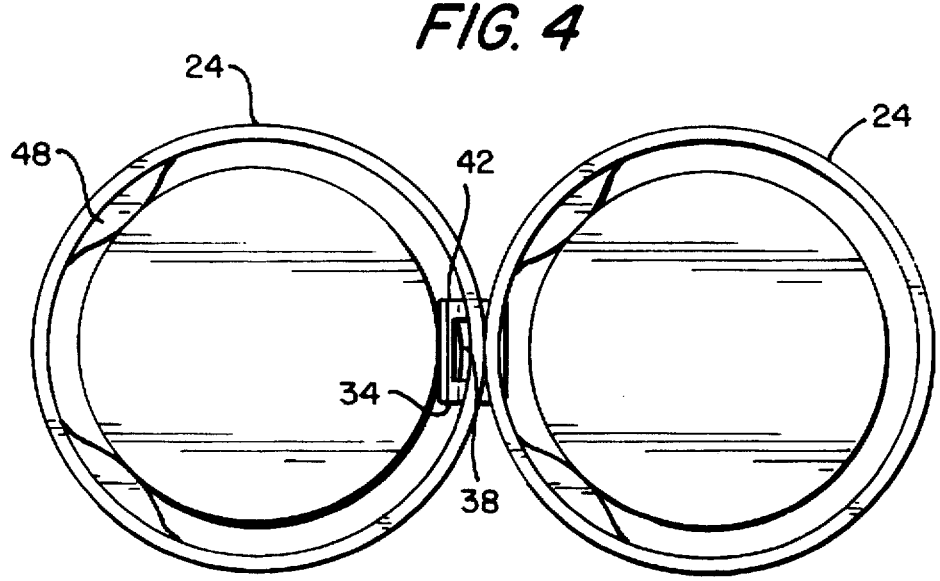
FIG. 4 is a top plan view thereof.

Referring particularly to FIGS. 2–4, the spacers 18 each include a plurality of ferrules 22 arranged in a generally symmetrical array and bounded by a peripheral band 24, such as illustrated in FIG. 1. Each ferrule 22 includes a generally cylindrical body 24 having a long axis and first and second slots 26 and 28 provided in diametrically opposite side walls. The first slot is elongated in the direction of the axis of the cylindrical ferrule body 24 and has a pair of tabs 30 spaced axially one from the other and which project from one lateral edge of the first slot 26 toward, but terminate short of, the opposite edge 32 of slot 26. The second slot 28 has a comparable length as slot 26 and has a reduced width in comparison with slot 26. The reduced width of slot 28, however, is slightly larger than the width of the spring 34, which will now be described.

Figure 5:
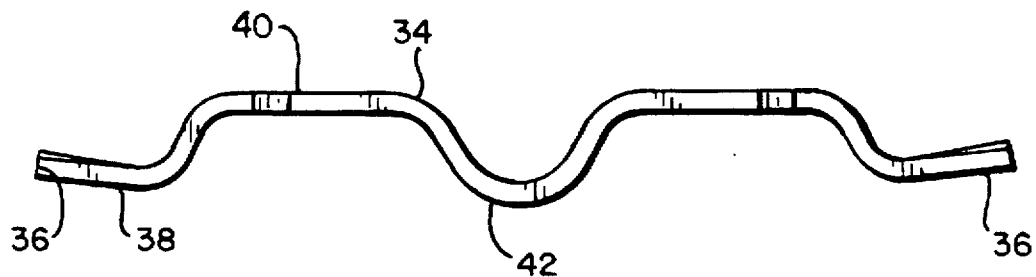
FIG. 5 is a side elevational view of a spring used in the ferrule assembly of FIG. 2.
Figure 6:
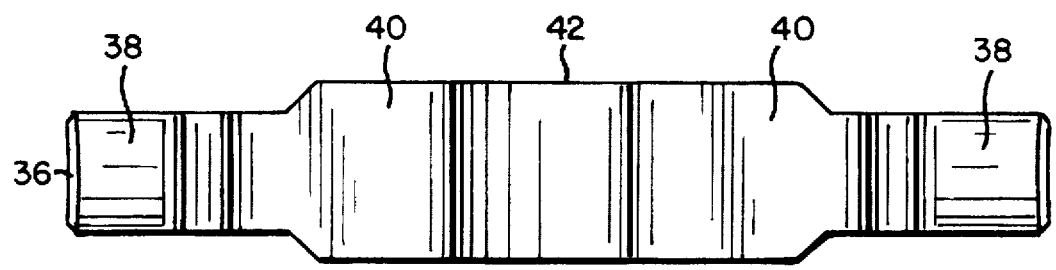
FIG. 6 is a top plan view of the spring illustrated in FIG. 5.
Figure 7:
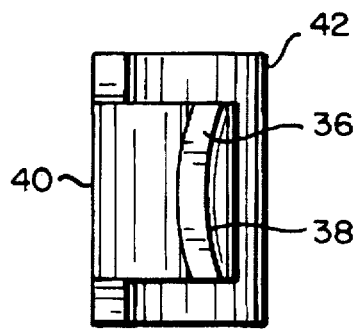
FIG. 7 is an end elevational view of the spring of FIG. 5.

Referring to FIGS. 5–7, spring 34 is stamped from sheet metal and acts as a simple beam supported at each end and which bears a load at mid-span. More particularly, spring 34 includes opposite ends 36, each of which is arcuate from side to side (see FIG. 7) to generally conform to the arcuate interior wall of the ferrule 24. End portions 38 of spring 34 extend inwardly but at an angle relative to the axis through the ferrule. At the inner ends of end portions 38, spring 34 is bent laterally outwardly to form a pair of flats 40 which lie in a common plane with one another when the spring is installed in the ferrule and loaded by a fuel rod. The adjacent ends of flats 40 are bent inwardly to form a mid-span projection 42 for engaging against the exterior wall of a nuclear fuel rod. In plan view, as illustrated in FIG. 6, the end portions 38 have a width less than the remaining portions of the spring 34, including flats 40 and projection 42, the transition from flats 40 to end portions 38 occurring in the flat 40.

Referring now to FIGS. 2–7, it will be appreciated that the tabs 30 on each ferrule define apertures 44 between tabs 30 and end portions of the ferrule 24 and a central aperture 46 between tabs 30. Additionally, as illustrated in FIG. 4, a pair of stops 48 are provided on each of the generally opposite sides of the ferrule from the spring 34, straddling the second slot 28, the stops 48 comprising indentations formed along the body 24. The stops are not shown in FIG. 2, to simplify the figure. FIGS. 3 and 4 illustrate the position of the spring between a pair of adjacent ferrules 24. In the position illustrated, the ends or tips 36 of the spring 34 bear against interior wall portions of the ferrule 24 beyond the ends of the first slot 26. The end portions 38 project away from the interior wall and toward the fuel rods within the ferrules. However, before any contact between the fuel rod is made, the end portions 38 turn such that the portions between the flats 40 and end portions 38 project through the apertures 44 between tabs 30 and the end portions of the ferrule 24. In the illustrated operable condition of the spring with the fuel rods in the ferrules of FIG. 3, it will be seen that the mid-span projection 42 projects through the central aperture 46 into engagement with the fuel rod in the ferrule, the left ferrule shown in FIG. 3. The spring 34, however, does not bear against or contact the fuel rod in the adjacent ferrule, i.e., the right-hand ferrule in FIG. 3. Rather, the flats 40 are spaced from the fuel rod but, as illustrated, lie within the second slot 28, consequently substantially precluding lateral movement of the spring. Additionally, endwise movement of the spring 34 is substantially precluded by the tabs engaging between the end portions and mid-span projections of the spring.

Figure 8A:
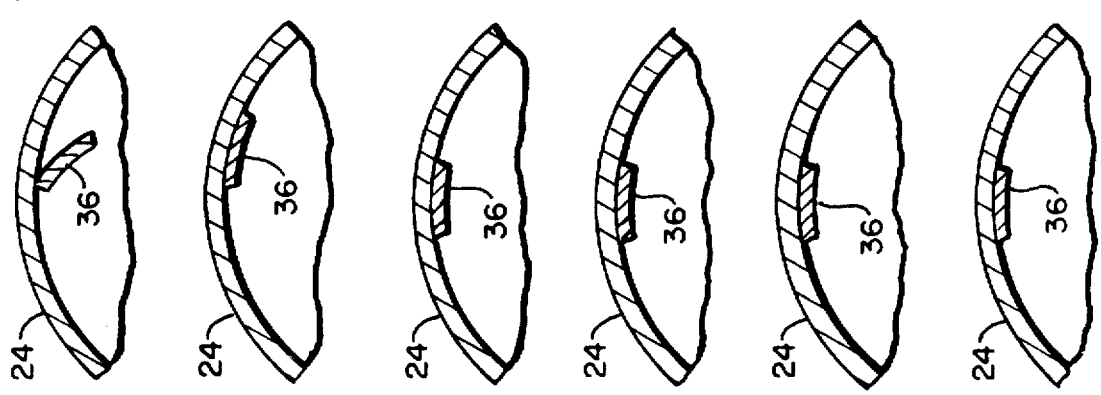
FIG. 8A, 8B and 8C are cross-sectional views thereof taken generally about on lines 8A—8A, 8B—8B and 8C—8C, respectively.
Figure 8:
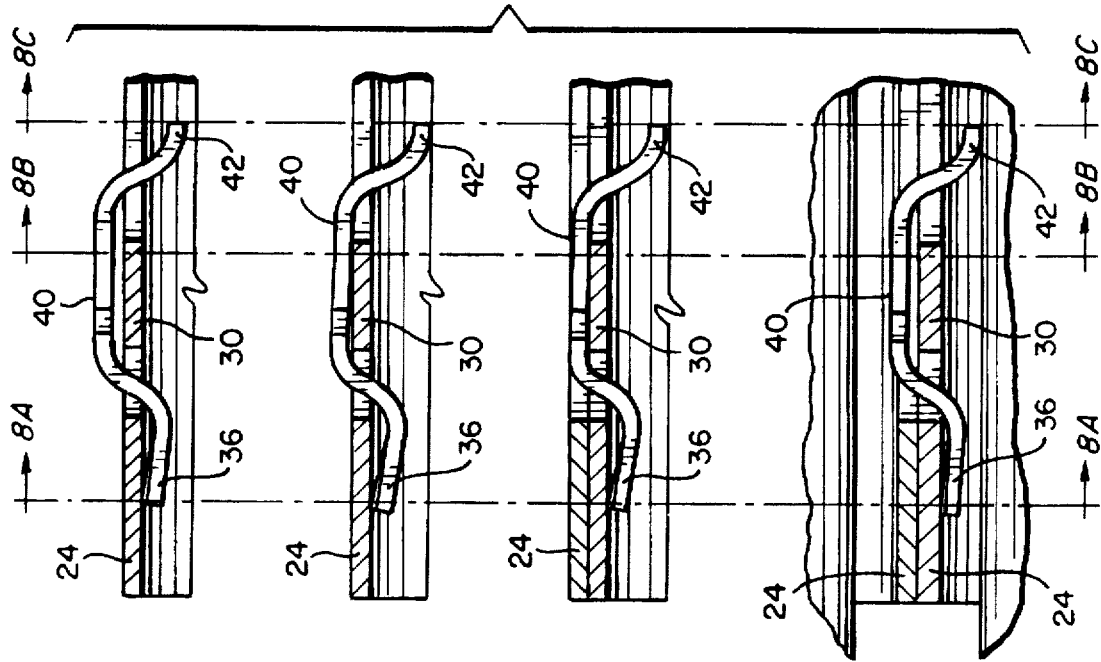
FIG. 8 is a fragmentary cross-sectional view of a spring and ferrule illustrating various stages of removal and insertion of the spring.
Figure 8C:
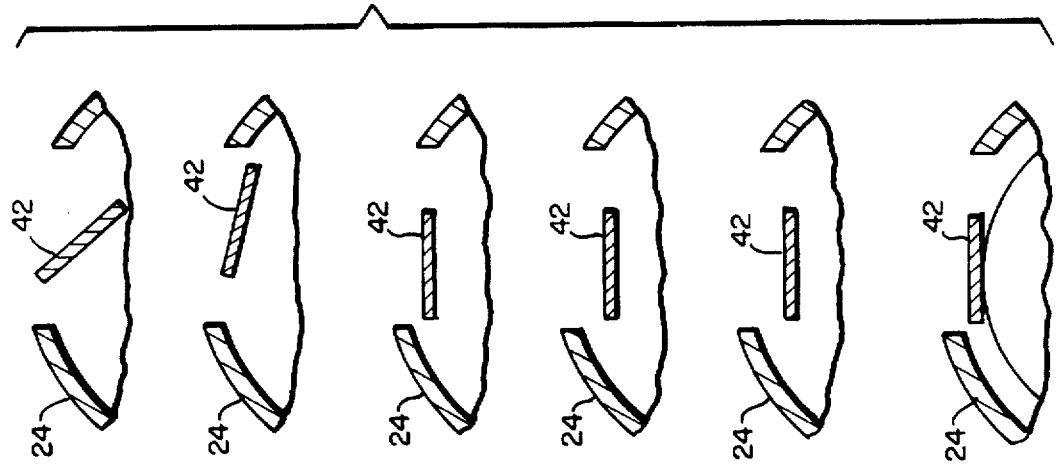
Figure 8B:
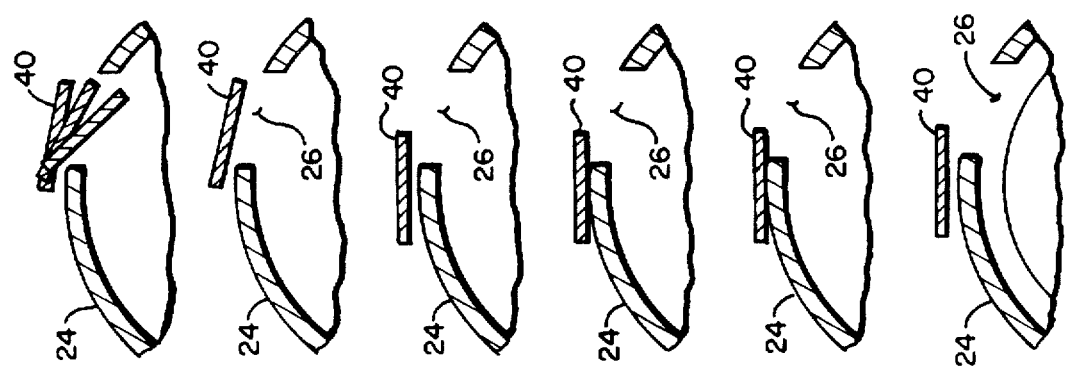

Referring now to FIGS. 8 and 8A–8C, the steps for removing the spring are listed from the bottom of the drawing figures upwards, while the steps for inserting the spring follow the reverse sequence, i.e., from the top views to the bottom views. FIG. 8 illustrates a series of cross-sectional views through the center of the ferrules and along the longitudinal center line of the spring. FIGS. 8A are cross-sectional views through the end of the spring where it bears against the interior wall of the ferrule, FIG. 8B are cross-sectional views through the flats of the spring and FIG. 8C are cross-sectional views through the mid-span projection where it bears against the fuel rod. Also, the four drawing figures of FIG. 8 correspond with the lower four figures of FIGS. 8A, 8B and 8C. Referring to these drawing figures, and to the insertion steps illustrated in the drawing figures from top to bottom, each spring 34 is initially located inside a ferrule 24 adjacent first slot 26, with the lateral tips 36 engaged against the interior wall surfaces and the flats 40 projecting partially through the apertures 44 (FIG. 8B). As illustrated at the top of FIG. 8C, the mid-span projection 42 lies within the ferrule adjacent the central aperture 46. In the next drawing figures from the top, the spring is rotated counterclockwise to locate the arcuate end portions 36 against the interior wall, the flats 40 outside the apertures 44 and partially overlying the tabs 30 and the mid-span projection 42 generally centrally of the slots 26. In the top figure of drawing FIG. 8, a force is applied to the spring 42 in an outward direction such that the flats 40, upon further rotation of the spring counterclockwise, clear the tabs 30. With the force removed, as illustrated in the second drawing figure from the top of FIG. 8, the natural spring bias causes the flats 40 to engage the tabs 30. The next drawing figure below illustrates the arrangement with the fuel rod removed and with the adjacent cell. In the final drawing figure in FIG. 8 and corresponding final drawing figures of FIGS. 8A–8C, the fuel rod has been inserted into the ferrule 24. It is noted, however, that in the preceding drawing figure, the tabs 30 which are engaged by the flats 40 restrain the deflection of the spring, while holding the spring firmly in place. Consequently, when the fuel rod is inserted into the ferrule as illustrated in the final figures of those drawing figures, the spring is deflected only marginally with consequent reduction in any possibility of spring and fuel rod damage. That is, the restraint provided the spring by the tabs 30 preloads the spring and does not affect the final load applied to the fuel rod by the spring when the spring is displaced outwardly to its final configuration as illustrated in FIG. 3.

To remove the spring, the procedure is reversed. Thus, upon removal of the fuel rod, the mid-span projection 42 projects inwardly with the flats engaging the tabs 30. A force is applied to the spring 42 to load the spring outwardly to space flat 40 from tab 30 whereby the spring can be rotated about the cell center. By rotating the spring in the drawing figure second from the top in FIGS. 8A, 8B and 8C about an axis close to the spring, the spring can now be removed from the cell center and removed axially from the ferrule.

The length of a preferred ferrule according to the present invention is 0.8 inches with a diameter of 0.508 to the outer wall, the wall having a thickness of 0.015 inches. The length of both slots is preferably 0.5 inches. The spring 34 has a length of 0.7 inches and a width of 0.12 inches, the end portions having a width of 0.076 inches. The depth of the spring between flats 40 and projection 42 is 0.070 inches.

Figure 9:
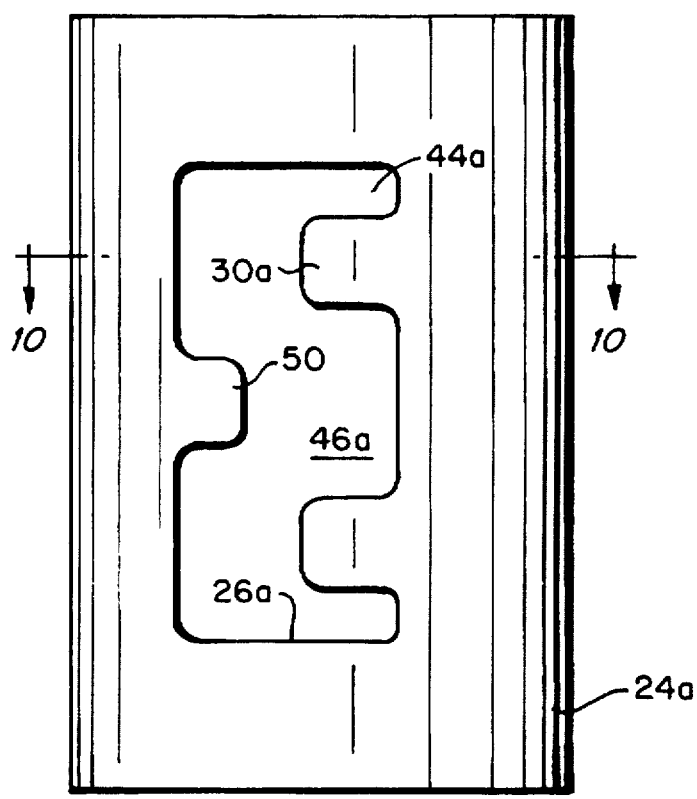
FIG. 9 is a side elevational view of a ferrule of a second embodiment of the present invention.
Figure 10:
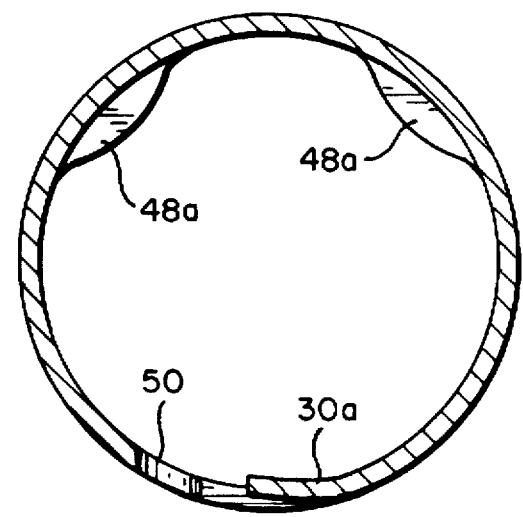
FIG. 10 is a cross-sectional view thereof taken generally about on line 10—10 in FIG. 9.
Figure 14:
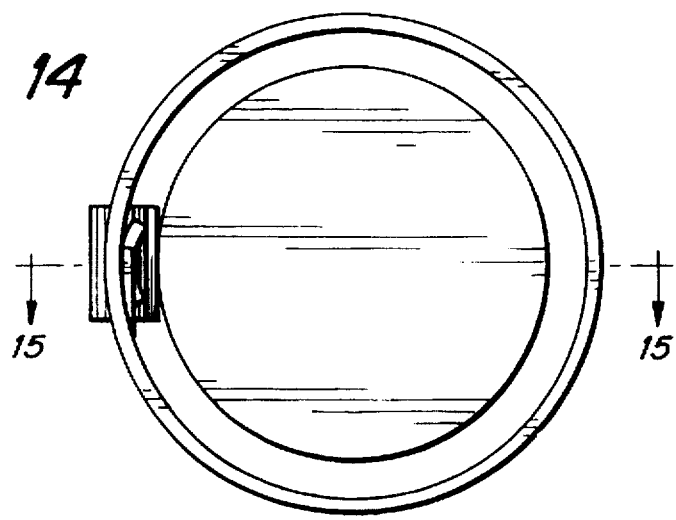
FIG. 14 is a plan view of a ferrule of the second embodiment hereof with the fuel rod inserted.
Figure 15:
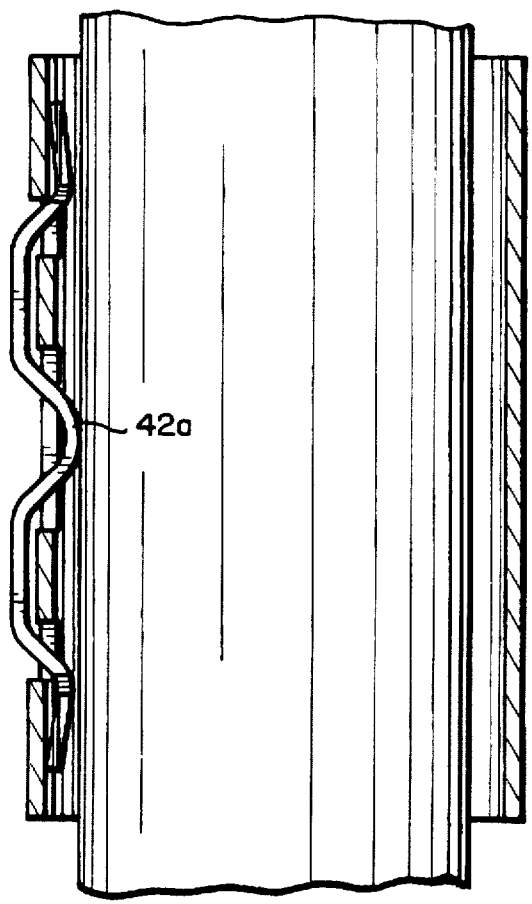
FIG. 15 is a cross-sectional view thereof taken generally about on line 15—15 in FIG. 14.
Figure 16A:
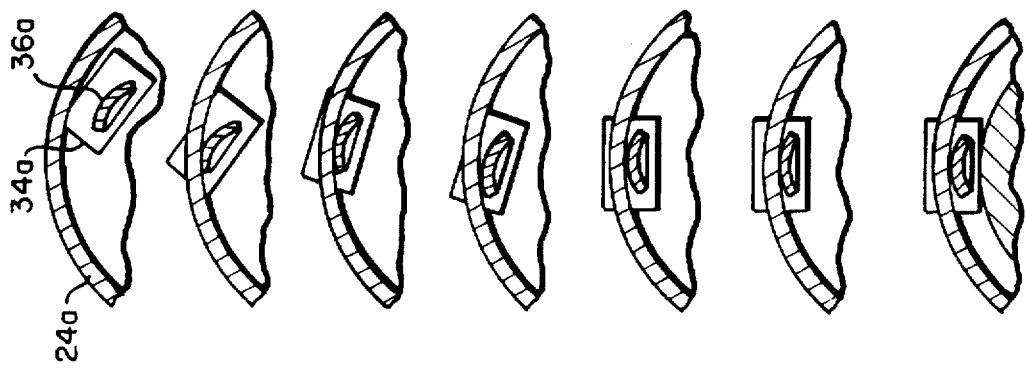
FIGS. 16A, 16B and 16C are cross-sectional views taken generally about on lines 16A—16A, 16B—16B and 16C—16C, respectively.
Figure 16:
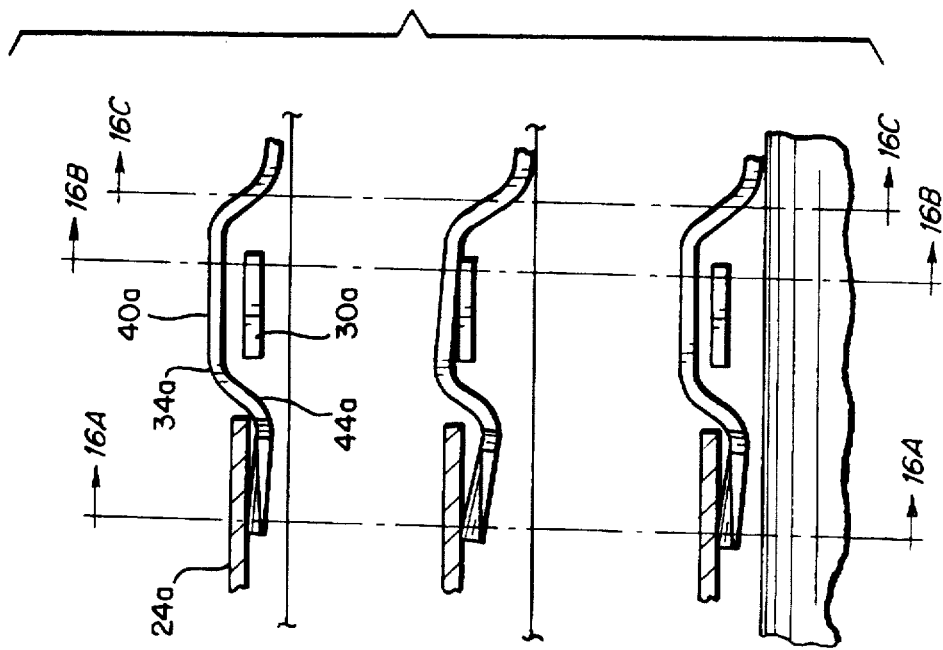
FIG. 16 is a fragmentary cross-sectional view of a ferrule and spring of the second embodiment in various stages of insertion and removal.
Figure 16C:
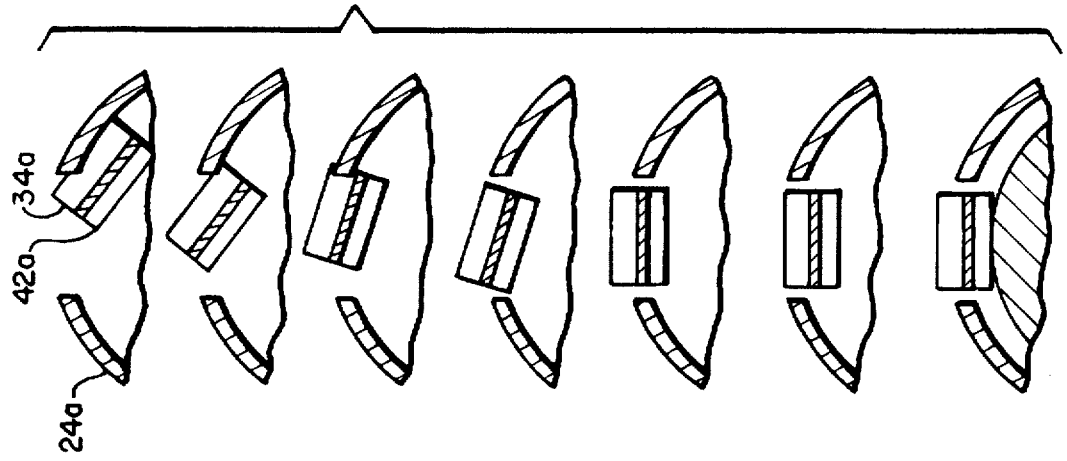
Figure 16B:
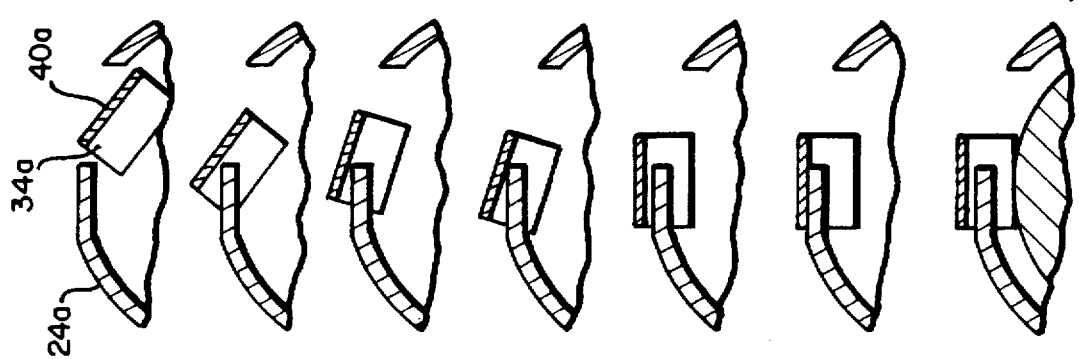

Referring now to a first variation of the ferrule spacer illustrated in FIGS. 9-16C, wherein like reference numerals are applied to like parts as in the prior embodiment followed by the suffix "a", it will be appreciated that in certain spacer designs, there are missing cells which enable inclusion of large water rods or define steam vent volumes above part-length fuel rods. To accommodate those configurations, as well as to provide for support of the fuel rods when the fuel bundle is assembled or transported in a horizontal condition, the ferrule 24a has a single slot 26a formed through a wall thereof and does not have a second slot, as in the prior embodiment. The slot 26a includes a pair of inwardly directed tabs 30a which are flattened and bent inward slightly as illustrated in FIG. 10. The pair of tabs 30a define apertures 44a and a central aperture 46a. Opposite central aperture 46a, there is provided an additional tab 50 which extends from an edge of the slot 26a toward, but terminates short of, the tips of tabs 30a. Stops 48a are formed on the opposite side of the ferrule 24a as illustrated in FIG. 10.

The spring 34a employed with the ferrules illustrated in FIGS. 9 and 10 has substantially the same configuration as the spring of the prior embodiment, with a slight increase in its length to increase the flexibility of the spring. Additionally, the transitions between the full width of the spring and the reduced width adjacent the end portions 38a are moved toward the ends 36a. Otherwise, the spring 34a is essentially the same as the spring of the prior embodiment.

In this form, an adjacent cell is not required to constrain the spring and each spring and cell are independent of one another. The spring 34a is located within the first slot 26a substantially as in the prior embodiment. However, the mid-span projection 42a prevents lateral displacement of the spring 34a in a direction away from the tabs 30a due to its engagement with the tab 50a, thereby maintaining the spring in the slot 26a.

Referring to FIGS. 16 and 16A-16C, the sequence of steps for insertion of the spring 34a into the slot 26a and its removal therefrom is similar to the sequence of steps previously described with respect to the prior embodiment. The spring 34a is initially inserted within the ferrule 34a as illustrated in the top FIGS. 16A-16C. In the next drawing figures from the top, the spring 34a is rotated counterclockwise to locate the arcuate end portions 36 against the interior wall, the flats 40a outside the apertures 44a and partially overlying the tabs 30a and the mid-span projection 42a generally centrally of the slots 26a. In the top figure of drawing FIG. 16, a force is applied to the spring 42a in an outward direction such that the flats 40a, upon further rotation of the spring counterclockwise, clear the tabs 30a. With the force removed, as illustrated in the second drawing figure from the top of FIG. 16, the natural spring bias causes the flats 40a to engage the tabs 30a. In the final drawing figure in FIG. 16 and corresponding final drawing figures of FIGS. 16A-16C, the fuel rod has been inserted into the ferrule 24a. It is noted, however, that in the preceding drawing figure, the tabs 30a which are engaged by the flats 40a restrain deflection of the spring 24a, while holding spring 24a firmly in place. Consequently, when the fuel rod is inserted into the ferrule as illustrated in the final figures of those drawing figures, the spring is deflected only marginally with consequent reduction in any possibility of spring and fuel rod damage. That is, the restraint provided the spring by the tabs 30a preloads the spring and does not affect the final load applied to the fuel rod by the spring when the spring is displaced outwardly to its final configuration.

To remove the spring, the procedure is reversed. Thus, upon removal of the fuel rod, the mid-span projection 42a projects inwardly with the flats engaging the tabs 30a. A force is applied to the spring 42a to load the spring outwardly to space flat 40a from tab 30a whereby the spring can be rotated about the cell center. By rotating the spring about an axis close to the spring, the spring can be removed.

Figure 17:
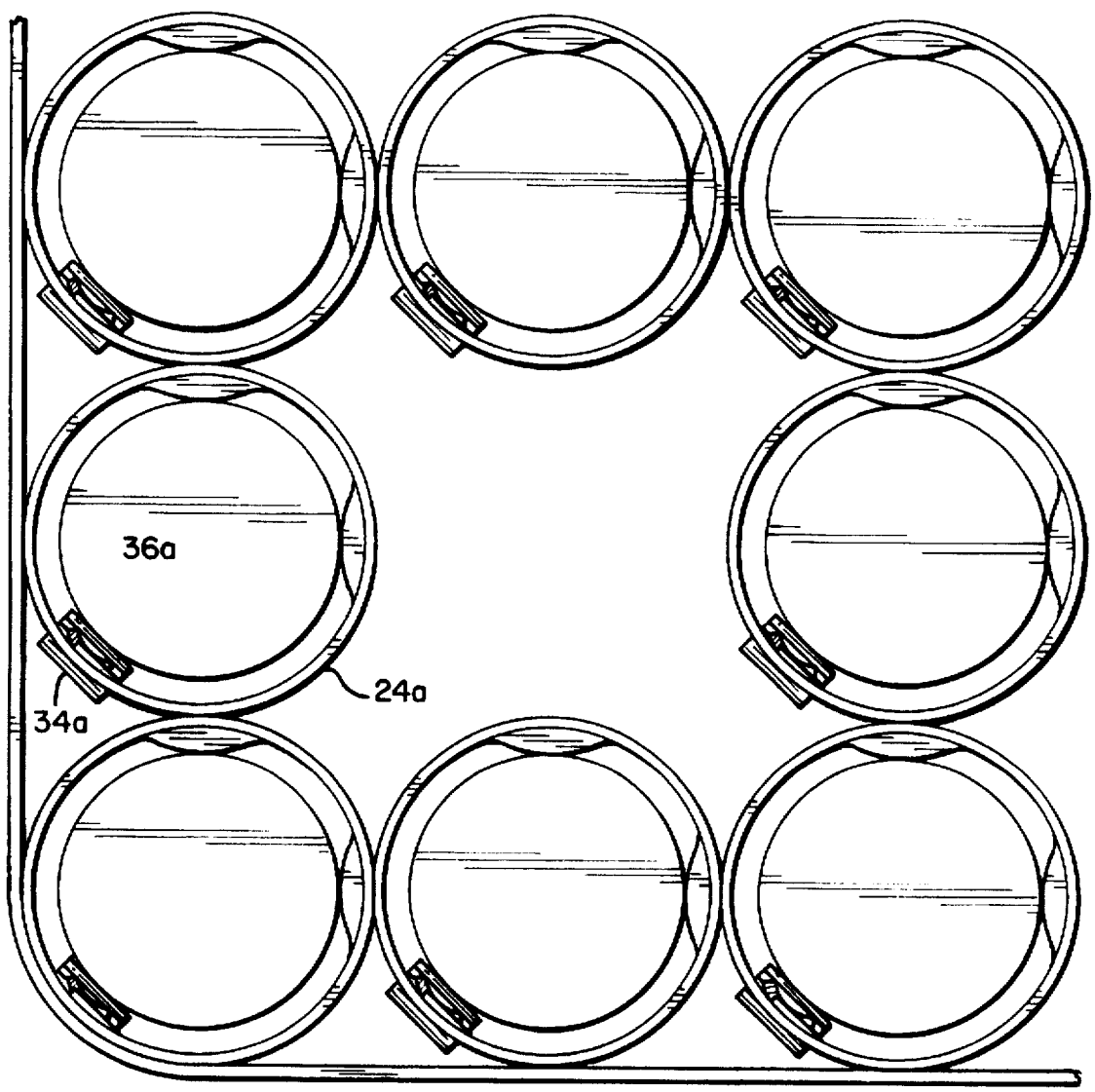
FIG. 17 is a fragmentary plan view of a spacer illustrating an arrangement of ferrule spacers according to the second embodiment of the present invention.
Figure 19:
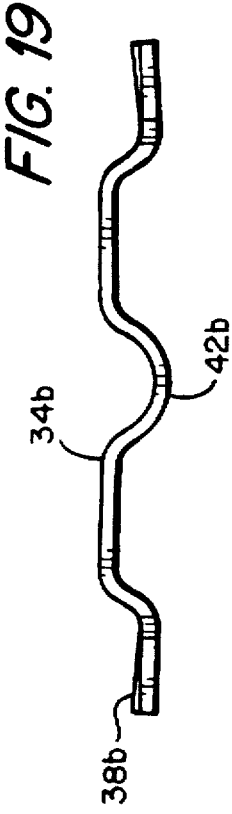
FIG. 19 is a side elevational view of a spring for use with the third embodiment hereof.
Figure 20:
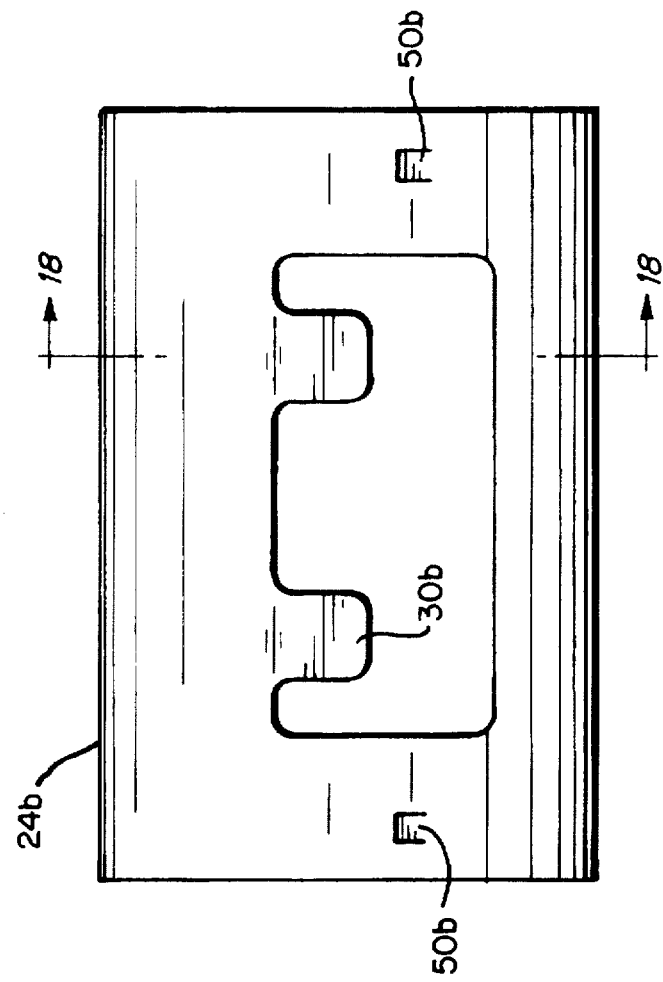
FIG. 20 is a side elevational view of a ferrule used in the third embodiment hereof.
Figure 18:
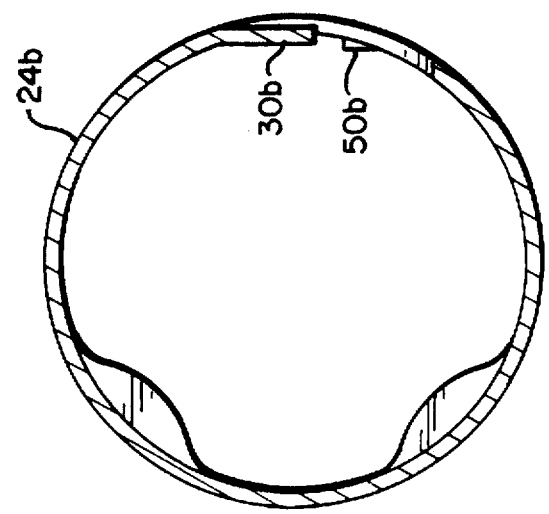
FIG. 18 is a cross-sectional view taken generally about on lines 18—18 in FIG. 20 of a ferrule according to a third embodiment of the present invention.

Referring to FIG. 17, it will be seen that a spacer includes a plurality of ferrules 24a arranged with the springs located substantially on a diagonal relative to the sides of the spacer. The opening in the middle where a ferrule and spring combination is missing can, for example, be a steam vent volume overlying a partial-length rod. Note that each of the ferrules and springs for each fuel rod are independent of the ferrules and springs for adjacent fuel rods and that each fuel rod is biased by the spring against stops located generally opposite the spring whereby the stops can be located on one side of the spacer, enabling horizontal disposition of the fuel bundle.

Referring now to drawing FIGS. 18-21 C, which illustrate a third embodiment of the present invention, wherein like reference numerals are applied to like parts followed by the suffix "b". The spring 34b may be either spring of the prior embodiments but the ferrule slot is modified to facilitate spring insertion and removal. In this form, the central tab 50 in the previous embodiment has been removed, which removes its function of restraining lateral motion of the spring in one direction. The tabs 30b of the ferrule 24b are bent inwardly out of the cylindrical outline of the ferrule 24b.

Two small inwardly bent tabs 50b are included. During insertion, the deflected spring ends 38b pass over these tabs. When the spring is in place, the tabs 50b prevent lateral motion of the spring. The spring insertion and removal procedures are similar to those previously described.

Figure 21B:
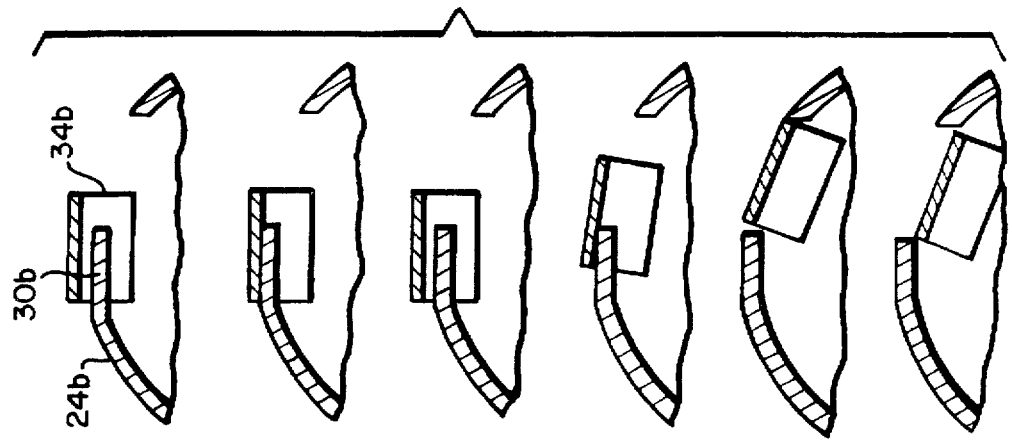
FIGS. 21A and 21B are cross-sectional views thereof taken generally about on lines 21A—21A and 21B—21B, respectively.
Figure 21A:
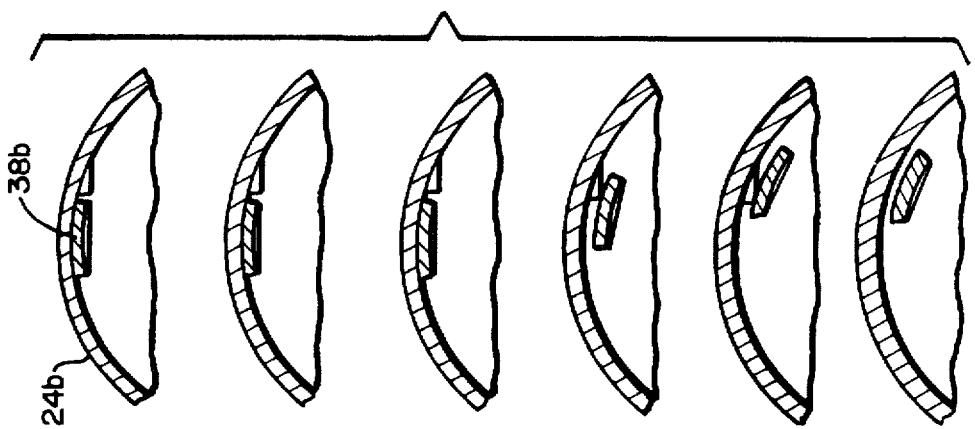
Figure 21:
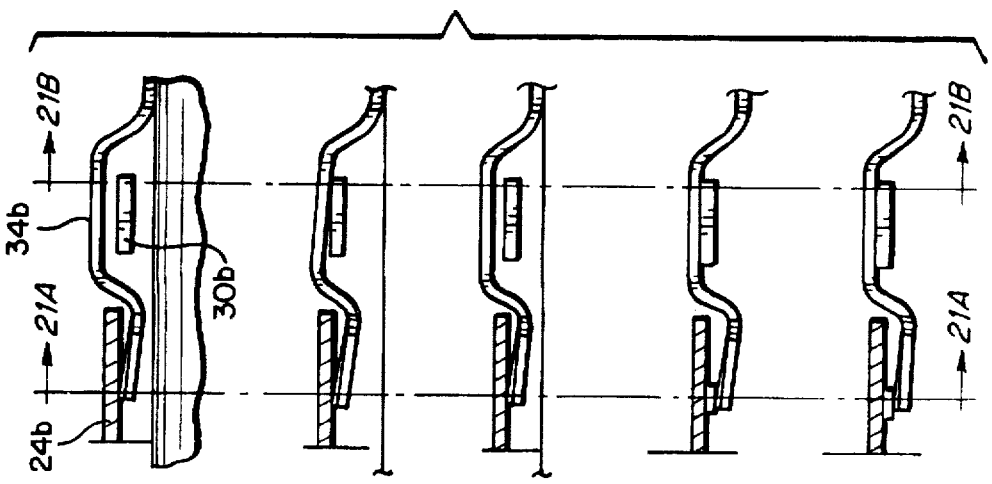
FIG. 21 is a fragmentary cross-sectional view illustrating the ferrule and spring of the third embodiment in various stages of insertion and removal.

FIGS. 21, 21A and 21B show a spring insertion procedure for this case. The steps for inserting the spring are listed from the bottom of the drawing figures upwards. The lower section on FIGS. 21A and 21B show cross-sections of the spring placed inside the ferrule similar to those previously described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A ferrule and spring combination for positioning at least one of a plurality of nuclear fuel rods in a spacer of a nuclear fuel bundle, comprising:

a generally cylindrical ferrule having an axis, a slot elongated in the direction of said axis and closed at opposite ends thereof, and a pair of tabs spaced axially from one another extending into said slot from an edge thereof and terminating short of an opposite edge of said slot to define axially spaced apertures along said slot;

an elongated spring having opposite ends engaging the long interior wall portions of the closed end portions of said ferrule between the respective opposite ends of said slot and ends of said ferrule;

said spring having flats located along said spring inwardly of said ends thereof for overlying said tabs outwardly of said ferrule and a projection located between said flats and projecting inwardly from said flats and through an aperture of said slot between said tabs for engaging a fuel rod disposed within the ferrule.

2. The combination according to claim 1 wherein opposite ends of said spring are arcuate in cross-section to generally conform to the arcuate interior wall portions of said ferrule.

3. The combination according to claim 1 wherein said ferrule has a second elongated slot opening through said ferrule at a diametrical side of said ferrule opposite the first-mentioned slot.

4. The combination according to claim 1 wherein said flats are spaced from said tabs.

5. The combination according to claim 1 including a second ferrule adjacent said first ferrule having an axis and an elongated slot in lateral registration with the slot of the first-mentioned ferrule, said flats extending through said slot of said second ferrule and precluding lateral displacement of said spring from the first slot.

6. The combination according to claim 1 including at least a pair of laterally spaced stops projecting inwardly of said ferrule and generally opposite said slot whereby the spring biases a fuel rod in the ferrule against said stops.

7. The combination according to claim 1 wherein the tabs form continuations of the circumferential extent of the ferrule and lie within the cylindrical confines thereof.

8. The combination according to claim 1 wherein said ferrule has a generally cylindrical wall, said tabs projecting inwardly of said wall of the ferrule.

9. The combination according to claim 8 including a third tab opposite the edge from which said pair of tabs project and projecting laterally toward the latter edge and at an axial location between said pair of tabs.

10. The combination according to claim 1 wherein the ends of said spring terminate short of the ends of said ferrule, respectively.

11. A spacer for positioning a plurality of nuclear fuel rods in a nuclear fuel bundle, comprising:

a marginal band defining an enclosed space;

a plurality of generally cylindrical ferrules in said space within said marginal band, each ferrule having an axis, a slot elongated in the direction of said axis and enclosed at opposite ends thereof, and a pair of tabs spaced axially from one another extending into said slot from an edge thereof and terminating short of an opposite edge of said slot to define axially spaced apertures along said slot;

each ferrule having an associated elongated spring having opposite ends engaging interior wall portions of closed end portions of said associated ferrule between the respective opposite ends of said slot and ends of said associated ferrule;

each spring having flats located along said spring inwardly of said ends thereof for overlying said tabs outwardly of said associated ferrule and a projection located between said flats and projecting inwardly from said flats and through an aperture of said slot between said tabs for engaging a fuel rod disposed within the associated ferrule.

12. The spacer according to claim 11 wherein opposite ends of each said spring are arcuate in cross-section to generally conform to the arcuate interior wall portions of said associated ferrule.

13. The spacer according to claim 11 wherein each said ferrule has a second elongated slot opening through said ferrule at a side of said ferrule diametrically opposite the first-mentioned slot, the spring associated with one ferrule having portions outwardly of said one ferrule and lying within the second slot of an adjacent ferrule.

14. The spacer according to claim 11 wherein said flats are spaced from said tabs, portions of each said spring extending between said end portions and said flats passing through apertures of said slots between end portions of the associated ferrule and said tabs.

15. The spacer according to claim 11 wherein each ferrule has at least a pair of laterally spaced stops projecting inwardly of said ferrule and generally opposite said slot whereby the spring biases the fuel rod in the associated ferrule against said tops.

16. The spacer according to claim 11 wherein each spring and associated ferrule are independent of adjacent springs and associated ferrules in the spacer for maintaining the fuel rods in spaced relation to one another.

17. The spacer according to claim 11 wherein the tabs form continuations of the circumferential extent of each ferrule and lie within the cylindrical confines thereof.

18. The spacer according to claim 11 wherein said tabs of each ferrule project inwardly of the circumferential wall thereof.

19. The spacer according to claim 18 wherein each ferrule includes a third tab opposite the edge from which said pair of tabs project and which third tab projects laterally toward the latter edge and at an axial location between said pair of tabs.

* * * * *